(12) United States Patent
Haefner

(10) Patent No.: US 10,931,076 B2
(45) Date of Patent: Feb. 23, 2021

(54) EXCITING A CRYSTAL OF A POCKELS CELL

(71) Applicant: TRUMPF Scientific Lasers GmbH + Co. KG, Unterfoehring (DE)

(72) Inventor: Matthias Haefner, Munich (DE)

(73) Assignee: TRUMPF Scientific Lasers GmbH + Co. KG, Unterfoehring (DE)

( * ) Notice: Subject to any disclaimer, the term of this patent is extended or adjusted under 35 U.S.C. 154(b) by 70 days.

(21) Appl. No.: 16/422,450

(22) Filed: May 24, 2019

(65) Prior Publication Data

US 2019/0280455 A1    Sep. 12, 2019

Related U.S. Application Data

(63) Continuation of application No. PCT/EP2017/079958, filed on Nov. 21, 2017.

(30) Foreign Application Priority Data

Nov. 24, 2016  (DE) .......................... 102016122705.6

(51) Int. Cl.
*H01S 3/115* (2006.01)
*G02F 1/01* (2006.01)
(Continued)

(52) U.S. Cl.
CPC ............ *H01S 3/115* (2013.01); *G02F 1/0136* (2013.01); *G02F 1/0327* (2013.01); *G02F 1/09* (2013.01); *H01S 3/107* (2013.01)

(58) Field of Classification Search
CPC ........ H01S 3/115; H01S 3/107; G02F 1/0136; G02F 1/0327; G02F 1/09
See application file for complete search history.

(56) References Cited

U.S. PATENT DOCUMENTS 3,694,769 A    9/1972 Hook et al.
3,818,373 A    6/1974 Chun et al.
(Continued)

FOREIGN PATENT DOCUMENTS

DE        1191043       4/1965
DE    102013012966      9/2014  .............. G02F 1/03
(Continued)

OTHER PUBLICATIONS

German Office Action for German Application No. DE 10 2016 122 705.6, dated Aug. 2, 2017.
(Continued)

*Primary Examiner* — Yuanda Zhang
(74) *Attorney, Agent, or Firm* — Fish & Richardson P.C.

(57) ABSTRACT

A Pockels cell utilizes high-voltage pulses for a polarization adjustment of electromagnetic radiation passing through the crystal, in particular laser radiation. The polarization adjustment involves applying a sequence of useful voltage pulses (N) to the crystal, each having a useful period duration (TP, N) and a useful pulse width (TN), and induces birefringence of the crystal via electric polarization in the crystal for polarization adjustment of the electromagnetic radiation. A sequence of compensation pulses (K, K1, K2) are applied to the crystal, each having a voltage curve, wherein the sequence is temporally overlaid by the sequence of useful voltage pulses (N) so that the voltage curves of the compensation pulses (K, K1, K2) counteract the inducing of a mechanical vibration in the crystal of the Pockels cell by the useful voltage pulses (N).

24 Claims, 7 Drawing Sheets

(51) Int. Cl.
*G02F 1/03* (2006.01)
*G02F 1/09* (2006.01)
*H01S 3/107* (2006.01)

(56) References Cited

U.S. PATENT DOCUMENTS

| | | | |
|---|---|---|---|
| 3,830,557 A | | 8/1974 | Hook et al. |
| 4,896,119 A | * | 1/1990 | Williamson ............ H01S 3/235 359/348 |
| 6,573,982 B1 | * | 6/2003 | Pruitt ..................... G01S 17/26 356/5.01 |
| 9,570,877 B1 | * | 2/2017 | Ammann .................. H01S 3/11 |
| 2004/0101001 A1 | * | 5/2004 | Bergmann ............ G02F 1/0327 372/25 |
| 2006/0018349 A1 | * | 1/2006 | Kopf ....................... H01S 3/235 372/30 |
| 2008/0018977 A1 | * | 1/2008 | Bergmann ............ G02F 1/0327 359/257 |
| 2011/0182306 A1 | * | 7/2011 | Hosseini ................ H01S 3/235 372/25 |
| 2011/0194576 A1 | * | 8/2011 | Bergmann ............ G02F 1/0305 372/25 |
| 2014/0376574 A1 | | 12/2014 | Skrabelj et al. |
| 2015/0114000 A1 | | 4/2015 | Tyagi et al. |
| 2015/0207292 A1 | | 7/2015 | Jonuska |
| 2016/0170243 A1 | * | 6/2016 | Bergmann ............ G02F 1/0327 359/257 |
| 2017/0038610 A1 | * | 2/2017 | Bergmann .......... H01S 3/10038 |

FOREIGN PATENT DOCUMENTS

| | | | | |
|---|---|---|---|---|
| DE | 102014201472 | | 8/2015 | ............... G02F 1/03 |
| EP | 1801635 | | 6/2007 | ............... G02F 1/03 |
| EP | 2800212 | | 4/2014 | ............. H01S 3/107 |
| GB | 987822 | | 3/1965 | |
| WO | WO 2015/114000 | | 8/2015 | ............... G02F 1/01 |

OTHER PUBLICATIONS

The International Search Report and Written Opinion for International Application No. PCT/EP2017/079958 dated Feb. 12, 2018.
Amundsen et al., "Low-Loss $LiNbO_3$ Q Switches: Compensation of Acoustically-Induced Refractive Index Variation", *IEEE Journal of Quantum Electronics*, vol. QE 23, No. 12, pp. 2252-2257 (Dec. 1987).

* cited by examiner

EXCITING A CRYSTAL OF A POCKELS CELL

CROSS REFERENCE TO RELATED APPLICATIONS

This application is a continuation of and claims priority under 35 U.S.C. § 120 from PCT Application No. PCT/EP2017/079958, filed on Nov. 21, 2017, which claims priority from German Application No. 10 2016 122 705.6, filed on Nov. 24, 2016. The entire contents of each of these priority applications are incorporated herein by reference.

TECHNICAL FIELD

The present invention relates to a method for exciting a crystal of a Pockels cell with (high) voltage pulses, in particular for providing an optically stable polarization window for a limited time. Furthermore, the invention relates to an amplification unit, in particular a regenerative amplification unit.

BACKGROUND

The control of a Pockels cell for the polarization adjustment of electromagnetic radiation, in particular laser radiation, is carried out by fast switching of high voltages applied to the crystal of the Pockels cell. The high voltage applied causes an electrical polarization in the crystal via the electro-optical effect, which, for example, leads to a desired birefringence of the crystal. Birefringence can be used, for example, to adjust the polarization state of laser radiation passing through the Pockels cell crystal.

An example of a Pockels cell drive circuit is described in EP 1 801 635 A1. Exemplary control circuits are based on so-called "double-push-pull" switching methods, which allow voltage rise times in the range of a few nanoseconds. It is also known that switching the voltage that fast can be accompanied by mechanical oscillations of the crystal caused by a piezoelectric effect occurring at the same time as the electro-optical effect.

Mechanical damping of such resonances is achieved, for example, by appropriately using damping foils and by attaching the crystals to special holders by soldering or gluing. DE 10 2013 012 966 A1 discloses, for example, that mechanical vibrations can be damped by connecting the crystal to the electrodes by material closure. In addition, EP 2 800 212 A1 discloses with regard to the so-called "acoustic ringing" of an electro-optical modulator that a modulation pulse width can be approximately tuned to an integer multiple of the period duration of the mechanical oscillation of the "acoustic ringing".

SUMMARY

One aspect of this disclosure is based on the objective of providing a temporal window of use for a Pockels cell that is as unaffected as possible by mechanical vibrations.

At least one of these objectives is solved by disclosed methods for exciting a crystal of a Pockels cell and by a, particularly regenerative, amplifier unit disclosed herein.

In one aspect, a method for exciting a crystal of a Pockels cell with high-voltage pulses for polarization setting of electromagnetic radiation, in particular laser radiation, passing through the crystal comprises the following steps: applying a sequence of use voltage pulses to the crystal which each have a use period duration and a use pulse width and are configured to induce birefringence of the crystal via an electrical polarization in the crystal for the polarization setting of the electromagnetic radiation, in particular laser radiation; and applying a sequence of compensation pulses to the crystal, which each have a voltage profile, the sequence of compensation pulses being overlaid in time with the sequence of use voltage pulses such that the voltage profiles of the compensation pulses counteract an excitation of a mechanical oscillation in the crystal of the Pockels cell by the use voltage pulses.

In a further aspect, the invention relates to an amplification unit, in particular a regenerative amplification unit, with an amplification medium, an optical switch unit, which includes a Pockels cell and a polarization beam splitter for forming an optical switch, and a control unit for controlling the Pockels cell in accordance with the above method and the herein disclosed further developments of the method.

In a further aspect, the invention relates to a method for exciting a Pockels cell with pulsed high-voltage, whereby the pulsed high voltage includes repeating use pulses with a use period duration and a use pulse width and the pulsed high voltage is configured to change the optical properties of the Pockels cell such that a birefringence is induced in the Pockels cell. Thereby, the excitation includes further inhibiting pulses that respectively follow a use pulse and are configured such that a mechanical oscillation (acoustic shock wave) in the Pockels cell, which is excited by the use pulse, is damped.

In some embodiments, switching edges of the voltage profiles of the compensation pulses can be configured as mechanically acting portions of the voltage profiles of the compensation pulses such that their temporal profiles and their temporal positions relative to the use voltage pulses are set in a manner that the switching edges induce acoustic events in the crystal that destructively interfere with acoustic events in the crystal, which are caused by the use voltage pulses. Thereby, the temporal profile can be determined in particular by a rise time or a fall time of a switching edge.

In some embodiments, the use voltage pulses can each include a first voltage switching operation for setting a use voltage and a second voltage switching operation for terminating the presence of the use voltage, and at least one of the switching operations can be adapted to excite the mechanical vibration of the crystal of the Pockels cell and in particular to cause an acoustic shock wave. Thereby, the voltage profile of the compensation pulses can include at least one compensation switching operation for exciting an oscillation counteracting the mechanical oscillation excitable by the use voltage pulses. The counteracting oscillation can be phase-shifted to the mechanical oscillation excitable by the use voltage pulses; in particular it can have a phase shift in the range from 135° to 225°. Furthermore, the phase shift can lead to destructive interference with the mechanical oscillation excited by the use voltage pulses, wherein the phase position is optionally selected to optimize damping and to reduce and in particular to prevent overcompensation in the case of damped oscillations.

In some embodiments, the crystal can have at least one acoustic resonant frequency, which is set in particular by dimensions such as the extent of the crystal between electrodes for applying voltage, crystal type, crystal shape, crystal cut, an applied E-field vector and/or a scattering in originally non-excited spatial axes. Due to the use period duration, the sequence of use voltage pulses can in principle be suitable for exciting resonances of the crystal with the at least one acoustic resonance frequency, and the sequence of compensation pulses can be adapted to reduce, in particular prevent, the excitations of resonances in the crystal.

In some embodiments, the voltage profile of the compensation pulses can each have a first compensation voltage switching operation and a second compensation voltage switching operation. The first compensation voltage switching operation can occur after the voltage switching operation to be compensated substantially simultaneously or with a time delay, which substantially corresponds to a period or a multiple of the period of a resonant frequency of the crystal of the Pockels cell. The second compensation voltage switching operation can occur after the voltage switching operation to be compensated and subsequent to the associated first compensation voltage switching operation with a time delay that corresponds substantially to a period or an integer multiple of the period of a resonant frequency of the crystal of the Pockels cell.

The time delay between one of the use voltage pulses and the compensation pulse directly following that use voltage pulse can be, in particular substantially, zero so that the voltage switching operations occur at the end of the use pulse and at the beginning of the compensation pulse, in particular substantially, at the same time so that the associated vibration excitations compensate each other. For the compensation, voltage switching operations can be used that have a voltage gradient inverse to the use switching operation to be compensated.

The sequence of compensation pulses can include a plurality of compensation pulses for a use voltage pulse; the start of at least one of the subsequent compensation pulses can be delayed by an integer multiple of the resonance period with respect to the start of the first compensation pulse.

In some embodiments, the voltage profile of one of the compensation pulses can have a compensation voltage switching operation which takes place with a time offset of at most 12.5% of the resonance period of the crystal, for example of at most 5% to 10%, and in particular of at least 1% of the resonance period of the crystal, for example of 2% to 5%, after the second voltage switching operation. The voltage profile of one of the compensation pulses can have a compensation voltage switching operation which occurs with a time offset of maximum 12.5% of the resonance period of the crystal, for example of maximum 5% to 10%, and in particular of at least 1% of the resonance period of the crystal, for example of 2% to 5%, with respect to an integer multiple of the resonance period.

In some embodiments, the compensation pulses can form polarization windows whose start lies at a time offset of at most 12.5% of the use period duration relative to a delay of an integer multiple of the resonance period with respect to the second voltage switching operation of the use window and whose end lies at an integer multiple of the resonance period with respect to the start of the use window.

In some embodiments, at least one of the voltage switching operations of the use voltage pulses and of the compensation pulses can include a sudden voltage change, in particular in the range from a few hundred volts to a few kilovolts. Optionally, the voltage change of one of the compensation voltage switching operations can be in the order of magnitude of the voltage change of the voltage switching operation of the use voltage pulse, in particular comparable thereto or a fraction thereof.

In some embodiments, the voltage change of the compensation voltage switching operations of a compensation pulse can be reduced in comparison with the voltage change of the first use voltage switching operation and/or of the second use voltage switching operation, and the compensation optionally can be supplemented with at least one compensation voltage switching operation forming a further compensation pulse.

In some embodiments, the reduction of the voltage change of the compensation voltage switching operations in comparison with the voltage change of the first voltage switching operation and/or of the second voltage switch-off operation can be at least as large that the reduced voltage change between the compensation voltage switching operations, in particular in a resonator-internal application of the Pockels cell, for example in a regenerative amplification unit, causes a (laser) radiation loss in the optical beam path (in particular of a laser system) which in particular enables the target operation of the laser system.

In some embodiments, a plurality of resonance frequencies can be compensated by providing a plurality of compensation pulses and/or compensation pulses changing over time in the course of the sequence of use voltage pulses. Optionally, compensation pulses can form randomly controlled for a set of known resonance frequencies the sequence of compensation pulses. Furthermore, it is possible to avoid the excitation of resonances by completely randomly provided compensation pulses, i. e., to destroy the periodicity by additional "noise".

In some embodiments, electromagnetic radiation, in particular laser radiation, can be coupled selectively at the time of the use voltage pulses and optionally synchronously with the use period duration into an optical beam path through the Pockels cell.

In general, the implementation of the concepts proposed herein is in principle independent of the crystal geometry. Thus, the implementation of the concepts proposed herein can take place with little or no manufacturing effort, because these can be implemented as a method for suitable HV switches implemented in the control software.

The concepts disclosed herein for the excitation of a crystal of a Pockels cell with (high) voltage pulses can also be used for other polarization adjusting applications of the Pockels effect. The concepts described herein relate in particular to the coupling of electromagnetic radiation to be amplified, in particular laser pulses, and the decoupling of amplified laser pulses, in particular with Q-switched lasers, when "cavity dumping" or for regenerative amplification. Other applications include inter alia intensity and polarization modulation outside a cavity, e.g., when driving a pulse picker. Further applications include CW lasers, extensions with upstream pulse picker and Q-switch.

DESCRIPTION OF DRAWINGS

Herein, concepts are disclosed that allow at least partly to improve aspects of the prior art. In particular, additional features and their usefulness result from the following description of embodiments on the basis of the drawings. The drawings show.

DETAILED DESCRIPTION

Figure 1:
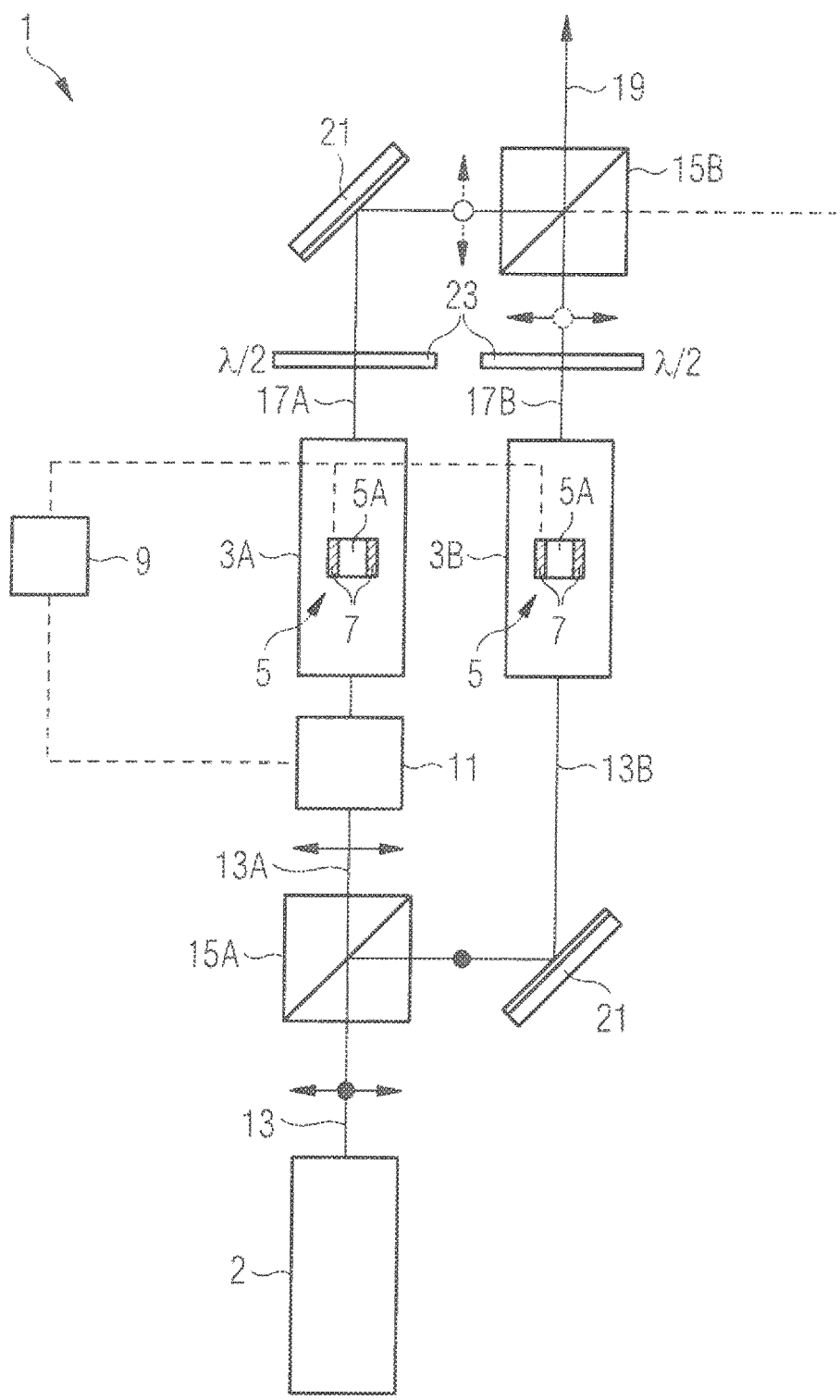
FIG. 1 a schematic illustration of a laser amplifier system with at least one Pockels cell.

The aspects described herein are partly based on the realization that the optical crystals used in Pockels cells (e. g., BBO or KTP crystals) exhibit more or less pronounced piezoelectric properties. These piezoelectric properties can cause electrical switching pulses, which were applied, to generate acoustic shock waves in the Pockels cell. Depending on inter alia the dimensions, the geometry, and the speed of sound of the respective crystal, the crystals can generally have one or more resonance frequencies, which can be excited individually or together during excitation with sequences of voltage pulses. An operation close to a resonant frequency (or an associated subharmonic) can lead to an unstable switching behavior, e.g., to an unstable input or output behavior in a regenerative amplifier. Furthermore, such an operation may result in mechanical damage to the crystal or to its mount.

It has now been realized that the oscillation behavior of the crystal can be influenced by means of secondary compensation pulses. In particular, it was recognized that compensation pulses can be arranged in time in the sequence of use pulses in such a way that mechanical vibrations do not occur at all (or at least only reduced), because the compensation pulses destructively interfere "away" through vibration superposition. The provided compensation pulses can thus permit a high-voltage switching operation close to the resonance frequencies (or their subharmonics) of the crystal. Such an excitation of a crystal of a Pockels cell can avoid the disadvantages of the mentioned unstable switching behavior and/or the mechanical destruction of the crystal.

The high-voltage excitation proposed herein is in particular also possible at several resonance frequencies, as they are often given for Pockels cells with excitation without compensation pulses. Thus, for a high-voltage switching operation to be performed, the choice of the time interval at which the Pockels cell is activated to provide a use window (herein also referred to as a polarization window or gain window) may be hardly or not at all restricted (compared to an uncompensated operation).

In other words, it is proposed herein to excite the Pockels cell with additional voltage pulses (the compensation pulses), whereby the voltage pulses are temporally matched to the use pulses in such a way that the acoustic shock waves resulting from the switching operations of the use pulses and the voltage pulses interfere as destructively as possible or at least so destructively that stable (e. g., laser) operation can take place. Under certain circumstances, this goal can be supported by additional measures such as a reduction of the pulse rate coupled into a regenerative amplification unit with, for example, an upstream pulse picker. In general, by using the concepts disclosed herein, the oscillation of resonance(s) can be effectively prevented or reduced to the extent required.

In the following, the proposed concept is explained in more detail in connection with FIGS. 1 to 6.

As mentioned above, for fast switching of electromagnetic radiation, in particular laser beams, one can use Pockels cells in which birefringence is induced by applying a high voltage (possibly use voltages up to and greater than 10 KV) to a suitable optical crystal. The switchable birefringence allows a temporally adjustable change of the polarization state of the light passing through the crystal. In combination with a polarizer, the quality of a laser resonator, for example, can be switched in this way. This is used, for example, in Q-switched lasers, for cavity dumping, and for regenerative amplifiers. The switching of the Pockels cell between two voltage states, i. e. the individual voltage switching process, is usually very fast (e. g., within a few nanoseconds), whereby a voltage state is maintained over an adjustable duration of the polarization window (e. g., for a few microseconds). This makes it possible, for example, to select individual (laser) pulses of a pulse train. Furthermore, the power loss in the electrical switches can be kept as low as possible.

FIG. 1 shows schematically an exemplary laser system 1 with a seed laser 2 as seed laser beam source and two regenerative amplification units 3A, 3B, whose output laser beams are superimposed, e.g., by means of a phase control system. At least one of the amplification units 3A, 3B includes, for example, a Pockels cell 5 with a crystal 5A arranged between contact electrodes 7 for providing a gain (time) window by means of an electrooptical effect which influences the polarization of laser radiation (for example circulating ultrashort laser pulses) present in the respective amplification units 3A, 3B. The laser system 1 also includes a control unit 9 and optionally a pulse picker 11 upstream of the amplification unit 3A.

A primary laser beam 13 of the seed laser 2 is divided by a beam splitter 15A into two (coherent) partial beams which are indicated in FIG. 1 as first seed laser beam 13A and second seed laser beam 13B. Each partial beam is supplied to the associated amplification unit 3A, 3B for generating a first amplified laser beam 17A based on the first seed laser beam portion 13A and a second amplified laser beam 17B based on the second seed laser beam 13B, respectively. For example, with the help of another beam splitter 15B, the amplified laser beams 17A, 17B are collinearly superimposed to form a sum laser beam 19.

FIG. 1 also shows deflecting mirrors 21 and lambda half wave plates 23 for changing the polarization states of the laser beams (the polarization states indicated schematically with arrows/dots in FIG. 1). For efficient amplification, the Pockels cell 5 is used to set a desired polarization state in a gain window. The influence on the polarization of the laser radiation passing through the Pockels cell 5 during the gain window should be as unaltered and constant as possible with respect to time, whereby the beginning and end of the gain window should be performed with temporally steep edges.

Figure 2:
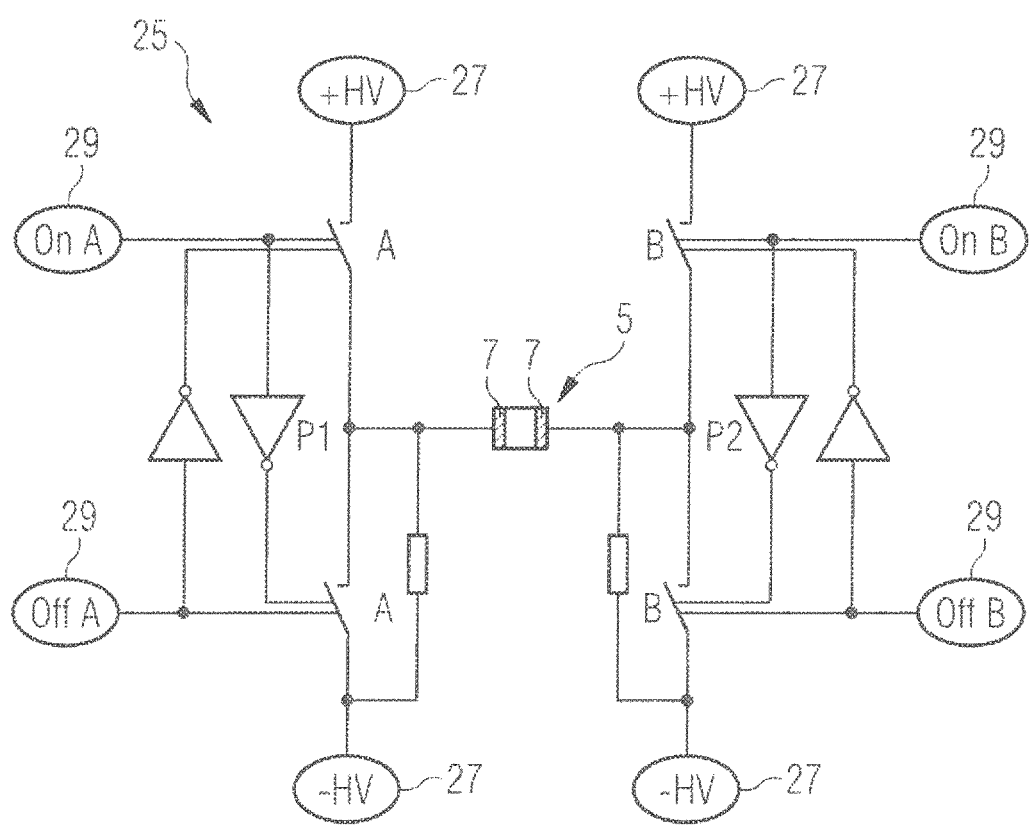
FIG. 2 shows an exemplary schematic double-push-pull circuit to excite a crystal of a Pockels cell with (high) voltage pulses.

FIG. 2 shows an exemplary double-push-pull circuit 25 that can provide high voltage levels with rise times of a few nanoseconds. The double-push-pull circuit 25 is an example of a known fast high-voltage circuit (see also FIG. 1 of the operating instructions "Manual Splitter Box Model BME_SP05", Revision 16.5.2006 with corresponding description). High voltages present at high voltage inputs 27 are passed on selectively to potential points P1, P2 via switches A, B, so that desired high voltages are present at the contact electrodes 7 of the Pockels cell 5 connected to these potential points P1, P2, and a corresponding electric field builds up in the crystal 5A of the Pockels cell 5. In FIG. 2, HV generally stands for the high voltage applied to the high voltage inputs 27. The control unit 9 triggers the switching operations via four control inputs 29 assigned to the switches A, B (On A; Off A; On B, Off B).

The double-push-pull circuit 25 exemplarily shown is designed for the control of the Pockels cell that is as flexible as possible and represents an HV switch according to Bergmann's double-push-pull principle, in which the individual control inputs 29 (On A; Off A; On B, Off B) can be controlled with a freely programmable trigger generator. During normal operation, "On A" and "Off B" or "Off A" and "On B" are switched simultaneously, so that the voltage is switched between +2HV and −2HV. These voltages, for example, can cause a delay of +/−λ/8 in the setups explained below in connection with FIGS. 3A and 3B.

Alternative circuits and drive patterns for excitation of a crystal of a Pockels cell, in particular of a pulse picker, with (high) voltage pulses include, e.g., overlapping switching operations such as On A-On B-Off B-Off A. The latter switching pattern is particularly suitable for very short switching windows. However, this may require a high voltage HV, which should be twice as high for the same birefringence (assuming identical crystal properties).

The operation of the excitation circuits in accordance with the concepts disclosed herein is performed with the control unit 9, which is adapted to implement the switching concepts disclosed herein and to activate and deactivate the various switches (see, e. g., high voltage switches A, B in FIG. 2) in order to provide the desired sequences of use and compensation (voltage) pulses at crystal 5A. In the embodiment of the double-push-pull circuit 25 according to FIG. 2, several voltage levels can be applied in the kilovolt range.

However, as explained in the beginning, the optical property cannot only (disadvantageously) be influenced by the electro-optical effect, but also by piezoelectric effects in connection with varying pressure oscillations in the crystal. By the piezoelectric effect, mechanical vibrations can induce electrical voltages, which in turn result in an electro-optical effect. The concepts of using compensation pulses disclosed herein are aimed at improving the optical quality of the polarization window provided by a Pockels cell (e.g., in the case of FIG. 1 of the gain window provided by Pockels cell 5 during amplification). For this purpose, the compensation pulses are arranged in time in the sequence of the use pulses, which determine the polarization window, in such a way that they counteract a mechanical oscillation in the crystal of the Pockels cell excited by the use pulses.

Figure 3A:
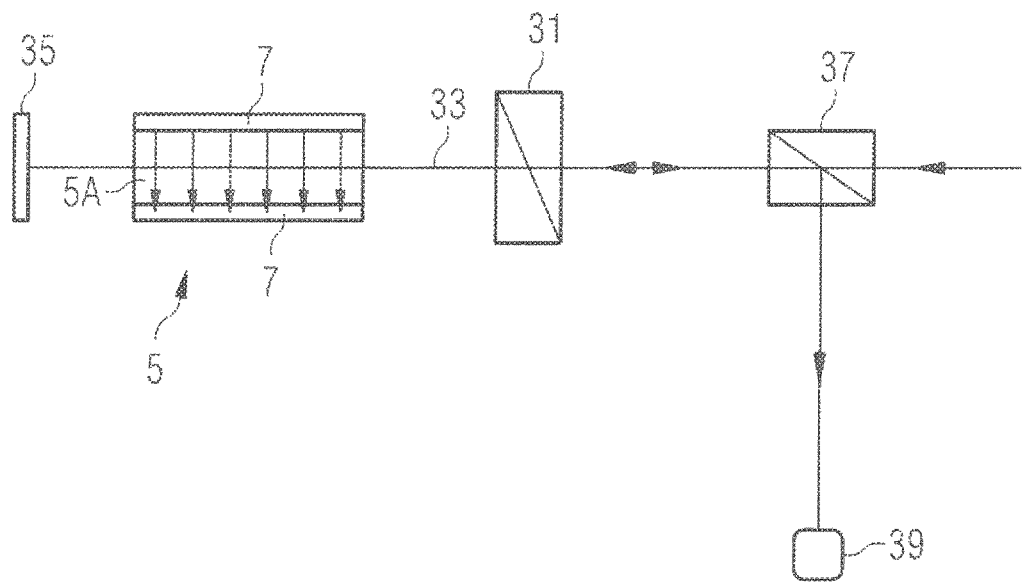
FIG. 3A to FIG. 3B show schematically illustrated setups for the use of Pockels cells when forming switchable wave plates.
Figure 3B:
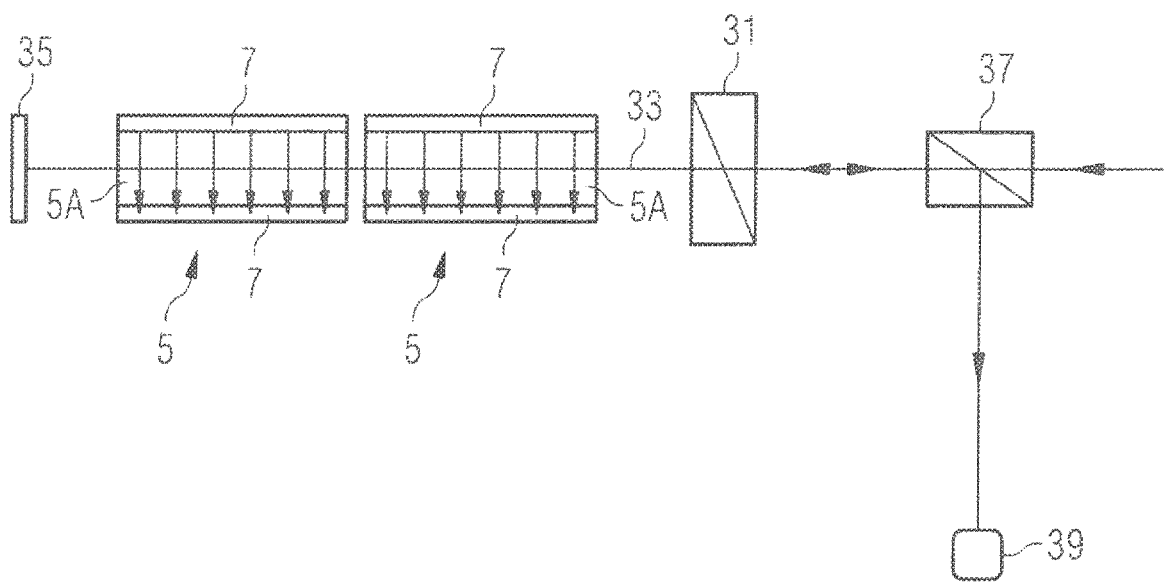

FIGS. 3A and 3B show exemplary arrangements in which one or two Pockels cells 5 are arranged together with wave plates 31 in the beam path of a laser beam 33, for example in a double passage via a mirror 35. In FIGS. 3A and 3B, these arrangements further have a beam splitter 37 and a photodiode 39 in order to check the properties of the polarization window, in particular its temporal quality.

The setup according to FIG. 3A shows how an optical switch can be realized with a Pockels cell. Thereby, the excitation of the crystal is designed in such a way that after the double passage through the wave plate 31 (e. g., a λ/8 wave plate) and the crystal 5A (e. g., switchable as +λ/8 wave plate or −λ/8 wave plate) during the polarization window (e. g., excited Pockels cell) no change in polarization is made, while outside the polarization window (e. g., not excited Pockels cell) a λ/2 wave plate is present and the returning laser beam 33 is reflected at the beam splitter 37. The setup according to FIG. 3A was used as a test setup for the investigations described below in connection with FIGS. 6A to 6C.

In comparison with the structure of FIG. 3A, the setup according to FIG. 3B has an additional Pockels cell (that is, e.g., also switchable as λ/8-well plate or −λ/8-well plate) and was used as a test setup for the investigations described below in connection with FIGS. 4A to 4C and 5A to 5C. The setup is such that—after the double passage through the wave plate 31 and two crystals 5A during the polarization window—there is a +3/4λ, wave plate, and outside the polarization window, there is a −λ/4 wave plate, so that with ideal switching behavior (especially without influence of the piezoelectric effect and the resulting mechanical oscillations) no switching process should be visible in the signal of the photodiode 39.

The optical crystals used in Pockels cells (e.g., BBO, KDP, KTP crystals) have more or less pronounced piezoelectric properties. As a result, the application of an electrical voltage to the crystal leads to an expansion or contraction of the crystal depending on the polarity. Is the electrical voltage changed very quickly (e.g., within a few nanoseconds), acoustic shock waves are generated which propagate within the crystal. The crystal itself, which is usually cuboid in shape, represents an acoustic resonator. Depending on the dimensions, the geometry, and the speed of sound of the crystal, this acoustic resonator can have several resonance frequencies.

Now, if the Pockels cell is switched at or near one of these frequencies (or its subharmonics), constructive interference of the individual shock waves occurs, which can lead to the up-swinging of one or more resonances. As the internal electric field of the crystal (resulting from the acoustic oscillation due to the piezoelectric effect) is superimposed on the external electric field by the applied voltage, the birefringence of the crystal is modulated at the resonant frequency.

A clean switching between defined polarization states is thus made more difficult. Moreover, the crystals can be mechanically damaged/destroyed by strong resonances.

As shown below, however, the up-swinging of the resonance can be prevented by preventing the constructive interference of the shock waves in the crystal. For the implementation disclosed herein, it is assumed that shock waves with a start phase shifted by 180° are generated when the Pockels cell is switched on and off, and that attenuation in the crystal can be neglected.

If the time between switching a voltage on and off now corresponds exactly (or almost exactly) to the period duration (or an integer multiple of the period duration), then the two shock waves interfere destructively and the up-swinging of the resonance is prevented. If this concept is extended, in principle any combination of one or more on/off switching events is effective, provided that a destructive acoustic interference is caused in sum.

In the studies described below, a HV switch according to the double-push-pull principle of Bergmann (see FIG. 2) was used to control the Pockels cell in the setup according to FIG. 3B. With a freely programmable trigger generator, the control inputs 29 "On A" and "Off B" or "Off A" and "On B" were switched simultaneously during normal operation, so that the voltage is switched between +2HV and −2HV, whereby a delay of +/−λ/8 was caused in the two Pockels cells.

Figure 4A:
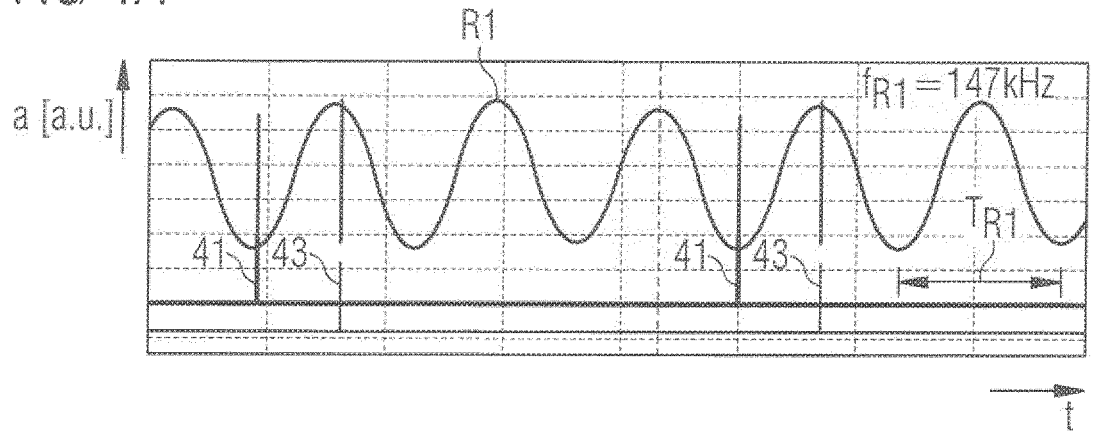
FIG. 4A to FIG. 4C show plots to illustrate the influence of excited resonances on the polarization state.
Figure 4B:
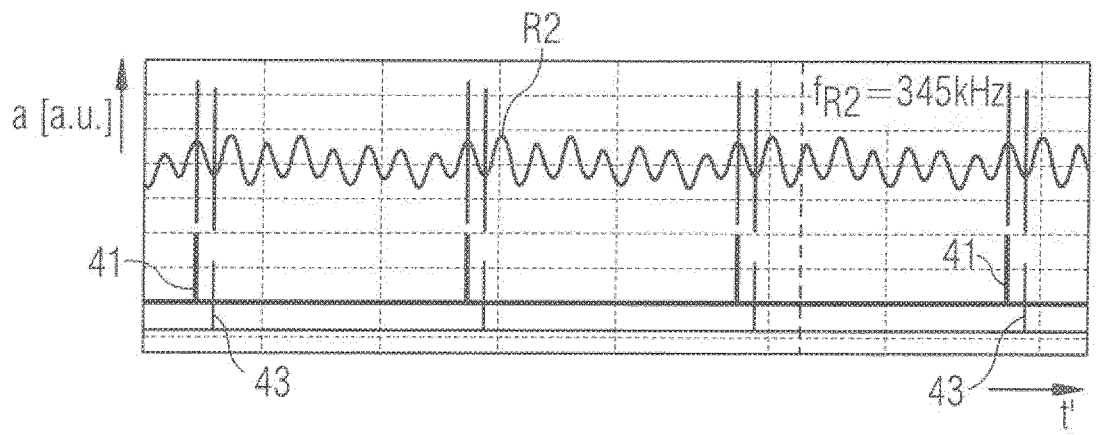
Figure 4C:
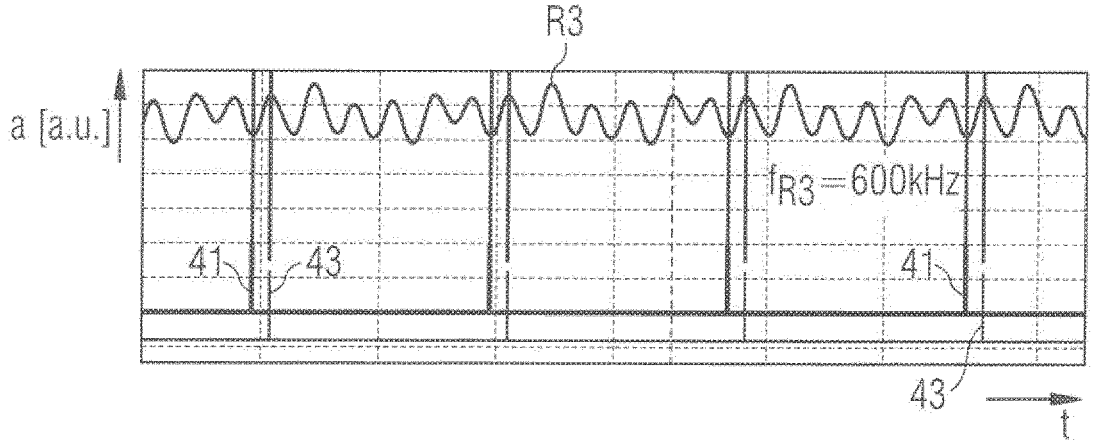

FIGS. 4A to 4C show exemplarily three excited resonances of the investigated Pockels cell, which were measured with the photodiode 39 in FIG. 3B. Applied over time t (t'), a photodiode signal R1, R2, R3 of a first, second, and third resonance with frequencies of $f_{R1}=147$ kHz, $f_{R2}=345$ kHz and $f_{R3}=600$ kHz (amplitude a in [a. u.]; time unit in FIG. 4B twice as large as in FIGS. 4A and 4C) can be seen.

Furthermore, FIGS. 4A to 4C show the activation of control inputs 29. One recognizes switch-on pulses 41 (On A/Off B) and switch-off pulses 43 (Off A/On B), which trigger voltage switching processes for the formation of a sequence of high-voltage pulses (the use pulses), each lying between a pair of switch-on and switch-off pulses. The switch-on pulse 41 and the switch-off pulse 43 are thus respectively assigned a use voltage switching operation. (Herein, there is generally a voltage switching operation to each switching pulse assigned.) In FIG. 3A, high voltage pulses of, e.g., 3.2 kV were used to superelevate the resonances. The λ/8 plate was rotated in such a way that 50% is reflected without voltage at the Pockels cell at the beam splitter. The dependence between reflection and voltage is a sinusoidal function, whereby the sensitivity is the greatest at the turning point. It is confirmed that the excitation of the resonances is strongest when the switch-off pulse is delayed by half a resonance period. In the photodiode signals R1, R2, R3, one can further see signal peaks, which are generated by the fact that, during a switching process, the desired, ideally invisible, phase jump occurs only at a finite speed.

Figure 5A:
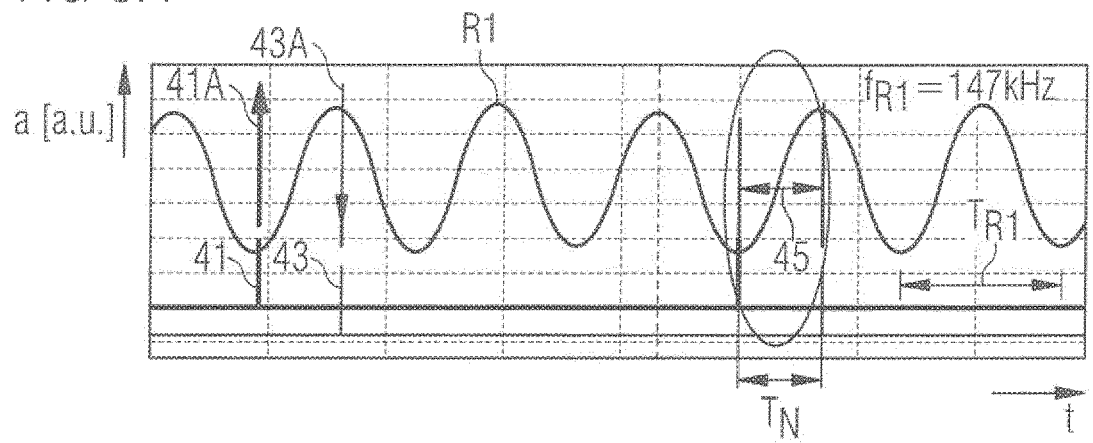
FIG. 5A to FIG. 5C show plots to illustrate the influence of the concepts disclosed herein on the excitation of resonances.
Figure 5B:
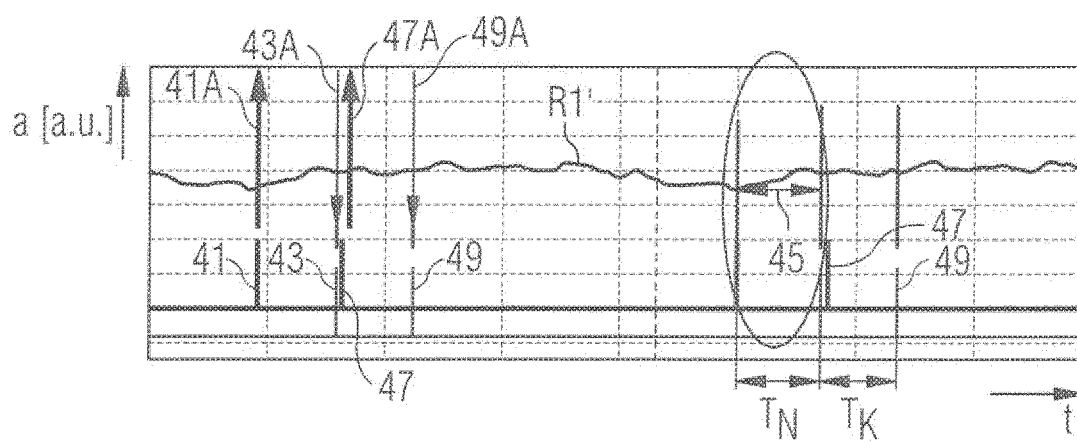
Figure 5C:
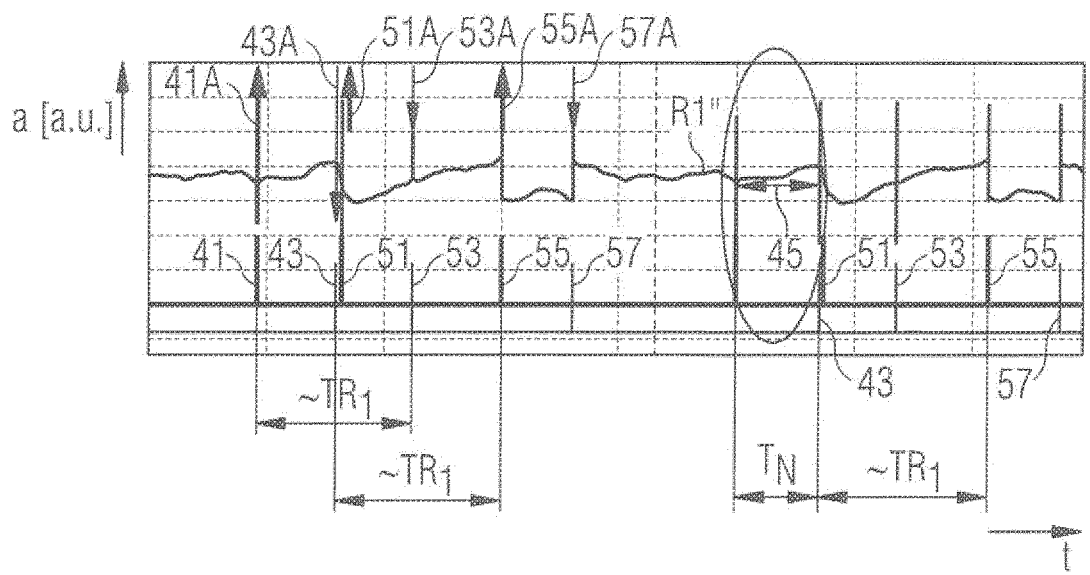

Regarding the resonance at $f_{R1}$=147 kHz, FIGS. 5A to 5C show an example of suppression with two exemplarily, integrated compensation pulse sequences (see FIGS. 5B and 5C in particular).

FIG. 5A essentially corresponds to FIG. 4A, whereby in the photodiode signal R1, there are illustrated a sequence of use pulses voltage switching operations with arrows 41A and 43A and a use pulse duration $T_N$ with an arrow 45. The use pulse duration $T_N$ corresponds to half the period $T_{R1}$ of the resonant frequency $f_{R1}$. One recognizes the intensity fluctuations of the photodiode signal R1 with the resonance frequency $f_{R1}$=147 kHz.

In FIG. 5B, a compensation pulse sequence was added to suppress the resonance effect, which consists of compensation (voltage) pulses, one of which is provided between each two use pulses. Correspondingly, one recognizes further pairs of switching pulses 47, 49 which trigger assigned compensation voltage switching operations. The result is a photodiode signal R1' with a substantially reduced fluctuation.

In the photodiode signal R1', one of the pairs of switching pulses 47, 49 is highlighted by arrows 47A and 49A. The switching pulses 47, 49 cause the associated compensation pulse following one of the use pulses. A compensation pulse duration $T_K$ is shown next to the use pulse duration $T_N$.

Reverse voltage switching operations are generally used to compensate for a use switching operation. I. e., due to the counter-phase excitation during the increase or decrease of the applied voltage difference, the (on) switching pulse 47 of the compensation pulse (On A/Off B) follows essentially directly (e. g., with a delay of 200 ns) after the switch-off pulse 43, and the (off) switching pulse 49 of the compensation pulse follows after the switch-off pulse 43 with a delay which corresponds to the use pulse duration $T_N$ (here 200 ns) (or a resonance period $T_{R1}$=2 $T_N$ after the switch-on pulse 41). Accordingly, the shock waves of the switch-off pulses 43 are quasi directly compensated and the shock waves of the switch-on pulses 41 are compensated with a delay of an integer multiple of the resonance period. The selected times of the switching pulses 47, 49 lead to a destructive interfering of the mechanical oscillations, which are assigned to the repeating switching operations (the sequence of use pulses and the sequence of compensation pulses). One can see that the resonance at 147 kHz can be effectively suppressed in this manner.

In FIG. 5C, one can see another excitation concept that can be implemented with HV switches that allow multiple voltage levels, such as the double-push-pull circuit 25, which can switch the two electrodes of Pockels cells separately.

In particular, as shown in FIG. 5C, a compensation pulse sequence is added to suppress the resonance effect, compensation pulse sequence having compensation (voltage) pulses, two of which are provided between each two use pulses. Accordingly, one recognizes further pairs of switching pulses 51, 53, 55, 57. The result is a photodiode signal R1", which is also reduced in its fluctuation.

In FIG. 5C, one sees the first pair of (on and off) switching pulses 51, 53, which is indicated by arrows 51A and 53A in the photodiode signal "R1" and causes a first compensation pulse following the use pulse. The (on) switching pulse 51 of the first compensation pulse also follows substantially directly (e.g., with a delay of 200 ns) after the switch-off pulse 43, and the (off) switching pulse 53 of the first compensation pulse takes place as in FIG. 5B after the switch-off pulses 43 with a delay corresponding to the use pulse duration $T_N$ (or a resonance period $T_{R1}$ after the switch-on pulse 41). However, with reference to FIG. 2, only electrode A is initially switched after the gain window of the use pulse, i.e., effectively switched between +2HV and 0HV. Accordingly, arrows 51A and 53A are half as long as arrows 41A and 43A. The reduced voltage reduces the acoustic shock wave of the first compensation pulse, e.g., it can only be half as strong. Accordingly, a resonator in a regenerative amplification unit would only be partially closed if only such a reduced compensation pulse follows.

As the acoustic shock waves of the first compensation pulses are smaller than those of the use pulses, the implementation according to FIG. 5C shows a further pair of (on and off) switching pulses 55, 57, illustrated by arrows 55A and 57A in the photodiode signal R1", for a more effective elimination. The switching pulses 55, 57 cause a second compensation pulse. The pair of switching pulses 55, 57 is essentially delayed by one resonance period $T_{R1}$ compared to the pair of switching pulses 51, 53. However, (on) switching pulse 55 can be delayed by exactly one resonance period $T_{R1}$ with respect to switch-off-pulse 43. In general it is important that the pulse pair 55/57 is delayed by $n*T_{R1}$ compared to the pulse pair 51/53 (with n as integer). All other times arise accordingly. As a result, all vibration-stimulating impulses can cancel each other out in sum. For example, electrode B can be used for the second compensation pulse to uniformly load the double-push-pull circuit 25.

In summary, one pair of full amplitude switching pulses (for the use pulse) and two pairs of half amplitude switching pulses (for the two compensation pulses) are superimposed. For example, the voltage change of one of the compensation voltage switching operations is in the order of a fraction of the voltage change of the voltage switching operations of the use pulse (N)—depending on the number of compensation pulses.

The embodiment of the excitation according to FIG. 5C has the further advantage that when used in a regenerative amplifier no second gain window is generated.

This is in contrast to the two polarization windows, which are available in the form of the excitation according to FIG. 5B by the switch-on and switch-off pulses 41, 43 and switch-on and switch-off pulses 47, 49. In the latter case, a laser pulse, which is in the resonator during the compensation pulse, could be amplified. In order to prevent this, the pulse picker 11 shown in FIG. 1 can only selectively couple pulses in the polarization window of the use pulse into the amplification unit 3A in the embodiment according to FIG. 5B, which can be implemented with simpler circuits.

In general, it can be seen that the compensation for an application in a regenerative amplification unit should be such that, although the resonator is only partially closed, the losses in a disk amplifier, for example, are still sufficiently high to prevent amplification outside the gain window.

Looking at the FIGS. 5A to 5C, one can see that the photodiode signals R1' and R1" are much more uniform compared to the photodiode signal R1 and, therefore, they are closer to the ideal "flat" curve. This means that the negative effects of the piezoelectrically generated shock waves were reduced by excitation via the compensation pulse sequence. Accordingly, a more uniform effect of the Pockels cell onto the laser radiation is provided during the polarization window.

Figure 6A:
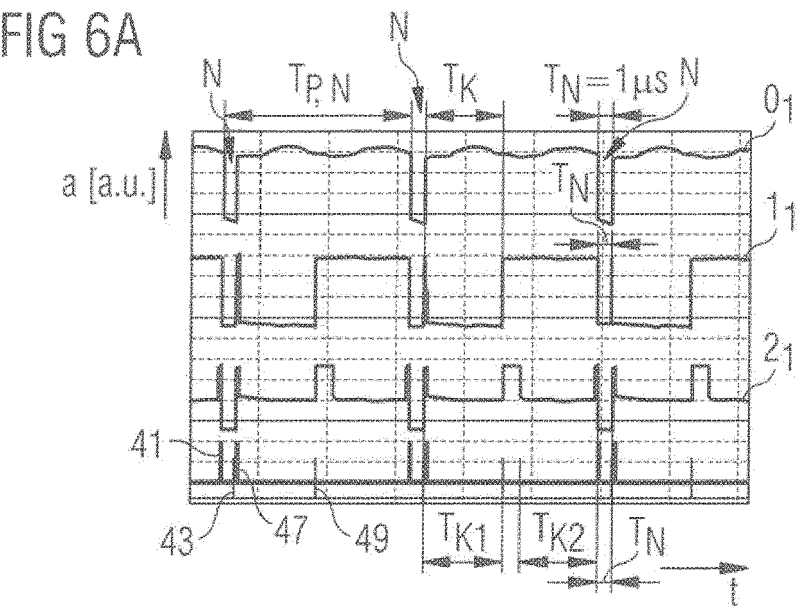
FIG. 6A to FIG. 6C show plots to illustrate the influence of the concepts disclosed herein on polarization states provided by voltage pulses for three pulse durations.
Figure 6B:
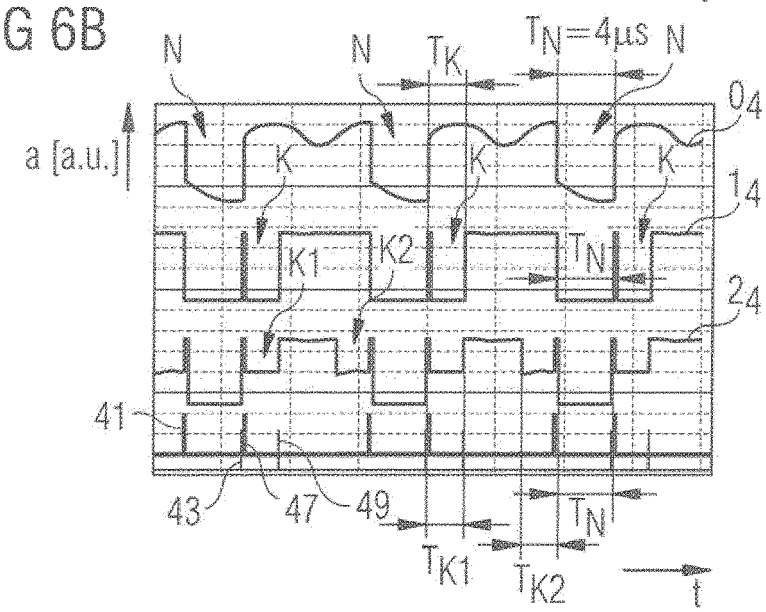
Figure 6C:
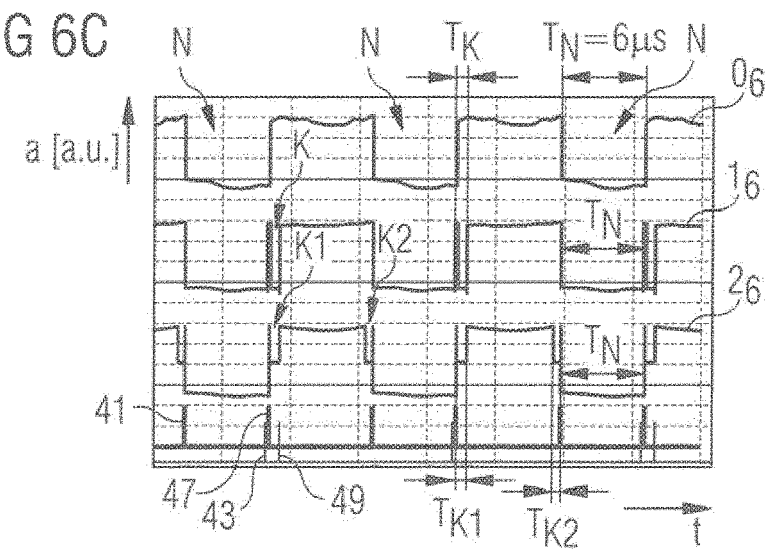

FIGS. 6A to 6C show, as an example for three amplification times (1 µs, 4 µs, 6 µs), the out-coupled intensity of a cw laser beam in the setup of FIG. 3A with a Pockels cell that has a resonance feature at a resonance period of 6.8 µs/resonance frequency of 147 kHz. The intensities were measured with the photodiode 39. For each of the three gain times, the resonance excitation of the Pockels cell was not compensated (represented by the (photodiode signal) curves $0_1$, $0_4$, $0_6$), compensated with one compensation pulse (represented by the curves $1_1$, $1_4$, $1_6$) and compensated with two compensation pulses (represented by the curves $2_1$, $2_4$, $2_6$). The respective (on and off) switching pulses 47, 49 for compensation with a compensation pulse (curves $1_1$, $1_4$, $1_6$) are shown in the lower part of the figures to illustrate the excitation concept.

In FIG. 6A, curve $0_1$ illustrates the sequence of use pulses N with pulse durations $T_N$ of 1 µs and a use period $T_{P,N}$. The use pulses N are recognizable by the compensation window having half the amplitude with respect to the use window. In addition, fluctuations in the photodiode signal can be seen which are superimposed on the signal characteristics and can be traced back to the excitation of the resonance with the resonance period of 6.8 µs. I. e., the use period $T_{P,N}$ is such that a resonant excitation of acoustic oscillations within the crystal 5A takes place by the use pulses.

Analogously, in FIGS. 6B and 6C, curves $0_4$ and $0_6$ illustrate the sequence of use pulses N with pulse durations $T_N$ of 4 µs and 6 µs, respectively.

Returning to FIG. 6A, the sequence of use pulses N can also be seen in curve whereby a second (longer) polarization window opens directly afterwards, which has the same optical properties as the use window, because the same voltage is switched. The polarization window goes back to the (on and off) switching pulses 47, 49, which open the polarization window (here also referred to as compensation window K) with the same polarization state as during the use polarization window directly after the switch-off pulse 43, and close it again after a resonance period $T_{R1}$ from the switch-on pulse 41 (duration $T_K$ of the compensation pulse K thus approximately 5.8 µs).

Analogously, in FIGS. 6B and 6C, curves $1_4$ and $1_6$ illustrate the sequence of use pulses N with pulse durations $T_N$ of 4 µs and 6 µs, respectively, in which in each case a sequence of compensation pulses with a compensation pulse for each use pulse is arranged in such a way that the compensation pulses K, in particular their switching operations, counteract a mechanical oscillation in the crystal of the Pockels cell excited by the use pulses N. Due to the extended use pulse durations, the duration $T_K$ of the compensation pulse K is reduced to approximately 2.8 µs and approximately 0.8 µs, respectively.

The uniform signal drop during the entire polarization window of the use pulse in curves $1_1$, $1_4$, $1_6$ shows that the superposing principle for resonance compensation works at each of the tested amplification times. Knowing the resonance frequencies of the Pockels cell, it is easy to automatically calculate the delays for the additional switching pulses for each gain time and repetition rate.

However, it can also be seen that a potentially disturbing influence of the compensation window can have an optical effect, especially if the resonance period is comparable to or considerably longer than the use period. This influence can be reduced by several compensation pulses with reduced amplitude.

A procedure with two compensation pulses K1, K2 is described using curve $2_1$ in FIG. 6A. Again the sequence of use pulses N and a directly following compensation window (compensation pulse K1) can be seen. The duration of this first compensation window/compensation pulse K1 is comparable to the duration of the compensation window of curve $1_1$ (this applies analogously to the duration of the first compensation window of curve $1_4$ as well as curve $1_6$). One can see again the reduced voltage change during the first compensation pulse K1.

With a delay corresponding to the resonance period $T_R$, a second compensation window (second compensation pulse K2) follows, also with reduced voltage change. With regard to the times, reference is made inter alia to the preceding description, in particular in connection with FIG. 5C. The second polarization window goes back to the switching pulses 55, 57. Due to the reduction of the voltage change, a polarization state results in the compensation windows which differs from the polarization state present during the use pulse.

Analogously, in FIGS. 6B and 6C, curves $2_4$ and $2_6$ illustrate the sequence of use pulses N with pulse durations $T_N$ of 4 µs and 6 µs, respectively, in which a sequence of compensation pulses with two compensation pulses K1, K2 for each use pulse N is arranged such that the compensation pulses K1, K2, in particular their switching operations, counteract a mechanical oscillation in the crystal of the Pockels cell excited by the use pulses N. Due to the extended use pulse durations, the duration of the compensation pulses K1, K2 is reduced again to approximately 2.8 µs and approximately 0.8 µs, respectively.

Also for the sequence of compensation pulses with two compensation pulses K1, K2, one can see from the uniform signal decrease during the entire polarization window of curves $2_1$, $2_4$, $2_6$ that the superposing principle works for each of the tested gain times.

Figure 7A:
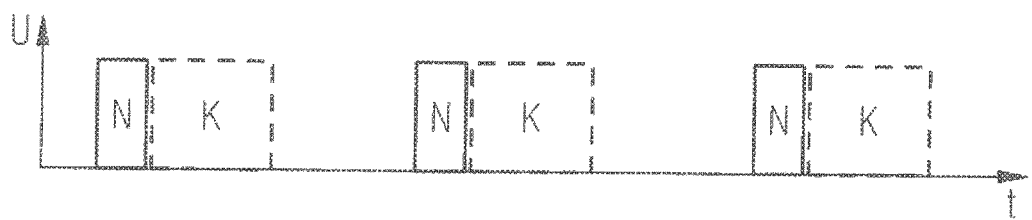
FIG. 7A to 7C show exemplary schematic sequences of combined use voltage pulses and compensation voltage pulses according to the disclosed concepts for excitation of a crystal of a Pockels cell for polarization adjustment.
Figure 7B:
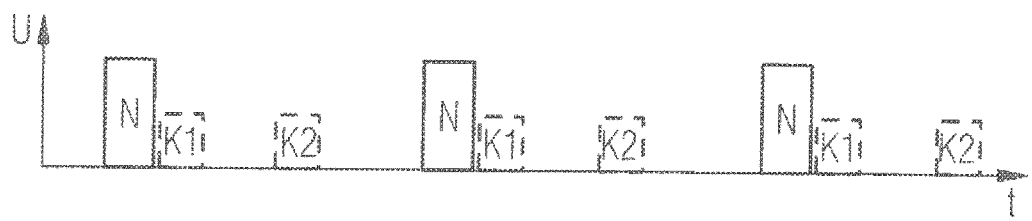

FIGS. 7A and 7B show exemplarily and schematically sequences of combined use voltage pulses and compensation voltage pulses according to the preceding exemplary embodiments, whereby the sequences can be used to excite a crystal of a Pockels cell, e. g., for polarization adjustment. Thus, one sees a sequence of use voltage pulses N, which are plotted in a time (t)-voltage (U)-diagram. With regard to mechanical effectiveness, the control is determined by the switching edges of the voltage curves of the use voltage pulses and the compensation pulses. As disclosed herein, these are adapted such that their temporal shape and their temporal positions relative to the use voltage pulses are such that they induce acoustic events within the crystal that destructively interfere with acoustic events in the crystal caused by the use voltage pulses. The temporal shapes can be determined in particular by a rise time or a fall time of a switching edge.

FIG. 7A also shows compensation pulses K directly following one of the use voltage pulses, whereby the compensation pulses K counteract a resonance. In contrast, FIG. 7B shows the compensation pulses K1 with a reduced voltage directly following one of the use voltage pulses, followed by a second compensation pulse K2, which is applied with a time delay in such a way that it counteracts the same resonance, for example.

It should be noted that, knowing the resonant frequencies of the Pockels cell, the delays for the additional switching pulses can easily be calculated automatically for each gain time and repetition rate.

In other embodiments, the temporal setting for the compensation pulses can be varied during operation. For example, in a group of successive gain windows, the additional pairs of switching pulses are temporally placed for each individual gain window in such a way that different resonances are combated. With sufficient damping or avoidance of the resonances in the crystal itself, several resonances may be damped simultaneously. The resonances to be damped can then be selected, for example, based on measurements of the resonance properties. In addition, a suitable algorithm can be used to quasi randomly select a target resonance during operation in order to implement broadband damping by the random damping of a mechanical oscillation.

Figure 7C:
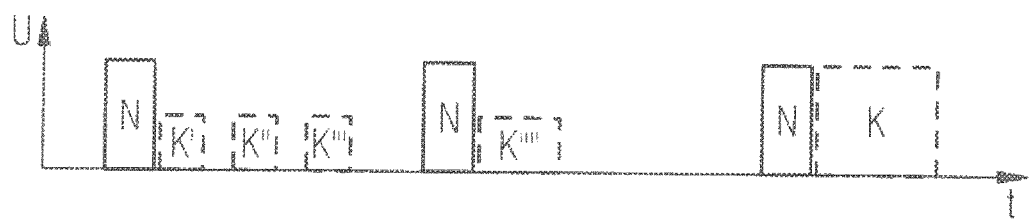

Such different pulse strategies are schematically illustrated in FIG. 7C. Thus, after the first use pulse N shown, one can see three compensation pulses K', K", K''', which are reduced in voltage and counteract one or more resonance frequencies. After the second use pulse N shown, only a compensation pulse K"" of greater length is switched, and after the third use pulse N shown, a compensation pulse K—similar to the one shown in FIG. 7A—is switched. It can be seen that one, several or also a broadband suppression of resonance effects can be implemented for the polarization state caused by Pockels cell switching due to the multitude of design possibilities.

In general, the switching operations, in particular the first switching operation and the second switching operation of the use pulses and optionally also the compensation switching operations, are set to cause a change in electrical polarization in the crystal of the Pockels cell. Furthermore, the voltage switching operations mentioned herein are operations reversing the polarity of a voltage applied to the Pockels cell, for example from +HV to −HV. The concepts disclosed herein are particularly relevant if the change of an electrical polarization in the crystal of the Pockels cell via a piezoelectric effect leads to a change in the size of the crystal and thus to acoustic oscillations and resonances in the crystal. The provision of compensation pulses then causes a reduction in the formation of acoustic oscillations and resonances in the crystal.

Depending on the implementation and the physical conditions, herein compensation can be understood as both partial compensation and complete compensation.

In addition to the fast switching operations in the ns range mentioned for the compensation pulses, which excite counter-oscillations, the compensation pulses can also have slower switching operations, for example a slower drop to a second voltage value, from which fast switching then takes place again. The latter can be implemented with more complex circuit concepts compared to FIG. 2.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A method for exciting a crystal of a Pockels cell with high-voltage pulses for polarization setting of laser radiation passing through the crystal, comprising:
   applying a sequence of use voltage pulses (N) to the crystal which each have a use period duration ($T_{P,N}$) and a use pulse width ($T_N$) and are configured to induce birefringence of the crystal via an electrical polarization in the crystal for the polarization setting of the laser radiation, and
   applying a sequence of compensation pulses (K, K1, K2), which each have a voltage profile, to the crystal, the sequence of compensation pulses (K, K1, K2) being overlaid in time with the sequence of use voltage pulses (N) such that the voltage profiles of the compensation pulses (K, K1, K2) counteract an excitation of a mechanical oscillation in the crystal of the Pockels cell by the use voltage pulses (N),
   wherein switching edges of the voltage profiles of the compensation pulses (K, K1, K2) are configured as mechanically acting portions of the voltage profiles of the compensation pulses (K, K1, K2) such that their temporal profiles and their temporal positions relative to the use voltage pulses (N) cause the switching edges to induce acoustic events in the crystal that destructively interfere with acoustic events in the crystal that are caused by the use voltage pulses (N), wherein the temporal profile is determined by a rise time or a fall time of a switching edge.

2. The method of claim 1, wherein,
   when the sequence of compensation pulses (K, K1, K2) comprises a plurality of compensation pulses (K1, K2) for a use voltage pulse (N), the start of at least one of the subsequent compensation pulses (K2) is delayed by an integer multiple of the resonance period ($T_{R1}$) with respect to the start of the first compensation pulse.

3. The method of claim 1, wherein a plurality of resonance frequencies are compensated by providing a plurality of compensation pulses (K, K1, K2) which change over time in the course of the sequence of use voltage pulses (N).

4. The method of claim 3, wherein at least some compensation pulses form randomly controlled for a set of known resonance frequencies ($f_{R1}$, $f_{R2}$, $f_{R3}$) the sequence of compensation pulses.

5. The method of claim 3, wherein at least some compensation pulses prevent the excitation of resonances by completely randomly provided compensation pulses, wherein the periodicity is destroyed by a correspondingly generated additional noise.

6. The method of claim 1, further comprising coupling laser radiation selectively at the time of the use voltage pulses (N) and synchronously with the use period duration ($T_{P,N}$) into an optical beam path through the Pockels cell.

7. A regenerative amplification unit, comprising
an amplification medium,
an optical switch unit having a Pockels cell and having a polarization beam splitter for forming an optical switch, and
a control unit for controlling the Pockels cell in accordance with the method of claim 1.

8. The regenerative amplification unit of claim 7, wherein the optical switch unit further comprises a double-push-pull unit for supplying voltage to the Pockels cell and/or a trigger unit for setting the use voltage pulses (N) and the compensation pulses (K, K1, K2) freely in time.

9. The regenerative amplification unit of claim 7, further comprising a pulse picker for coupling pulsed laser radiation in a time window given by the use voltage pulses (N) to prevent an optical pulse circulating in the amplification unit during the compensation pulses (K, K1, K2).

10. A method for exciting a crystal of a Pockels cell with high-voltage pulses for polarization setting of laser radiation passing through the crystal, comprising:
applying a sequence of use voltage pulses (N) to the crystal which each have a use period duration ($T_{P, N}$) and a use pulse width ($T_N$) and are configured to induce birefringence of the crystal via an electrical polarization in the crystal for the polarization setting of the laser radiation, and
applying a sequence of compensation pulses (K, K1, K2), which each have a voltage profile, to the crystal, the sequence of compensation pulses (K, K1, K2) being overlaid in time with the sequence of use voltage pulses (N) such that the voltage profiles of the compensation pulses (K, K1, K2) counteract an excitation of a mechanical oscillation in the crystal of the Pockels cell by the use voltage pulses (N),
wherein the use voltage pulses (N) each include a first voltage switching operation for setting a use voltage and a second voltage switching operation for terminating the presence of the use voltage, and at least one of the switching operations is adapted to excite the mechanical vibration of the crystal of the Pockels cell, and
wherein the voltage profile of the compensation pulses (K) comprises at least one compensation switching operation for exciting an oscillation counteracting the mechanical oscillation excitable by the use voltage pulses (N), wherein the counteracting oscillation is phase-shifted to the mechanical oscillation excitable by the use voltage pulses (N), and leads to destructive interference with the mechanical oscillation excited by the use voltage pulses (N).

11. The method of claim 10, wherein the counteracting oscillation has a phase shift in the range from 135° to 225°.

12. The method of claim 10, wherein the phase position is selected to optimize damping and to reduce overcompensation in the case of damped oscillations.

13. A method for exciting a crystal of a Pockels cell with high-voltage pulses for polarization setting of laser radiation passing through the crystal, comprising:
applying a sequence of use voltage pulses (N) to the crystal which each have a use period duration (TP, N) and a use pulse width (TN) and are configured to induce birefringence of the crystal via an electrical polarization in the crystal for the polarization setting of the laser radiation, and
applying a sequence of compensation pulses (K, K1, K2), which each have a voltage profile, to the crystal, the sequence of compensation pulses (K, K1, K2) being overlaid in time with the sequence of use voltage pulses (N) such that the voltage profiles of the compensation pulses (K, K1, K2) counteract an excitation of a mechanical oscillation in the crystal of the Pockels cell by the use voltage pulses (N),
wherein the crystal of the Pockels cell has at least one acoustic resonant frequency ($f_{R1}$, $f_{R2}$, $f_{R3}$) determined by parameters selected from the group consisting of the extent of the crystal between electrodes for applying voltage, crystal type, crystal shape, crystal cut, an adjacent E-field vector and/or a scattering in originally non-excited spatial axes, and
wherein the sequence of use voltage pulses (N) excites resonances of the crystal with the at least one acoustic resonance frequency ($f_{R1}$, $f_{R2}$, $f_{R3}$) on the basis of the use period duration ($T_{P, N}$), and the sequence of compensation pulses (K) is adapted to reduce the excitations of resonances in the crystal.

14. A method for exciting a crystal of a Pockels cell with high-voltage pulses for polarization setting of laser radiation passing through the crystal, comprising:
applying a sequence of use voltage pulses (N) to the crystal which each have a use period duration (TP, N) and a use pulse width (TN) and are configured to induce birefringence of the crystal via an electrical polarization in the crystal for the polarization setting of the laser radiation, and
applying a sequence of compensation pulses (K, K1, K2), which each have a voltage profile, to the crystal, the sequence of compensation pulses (K, K1, K2) being overlaid in time with the sequence of use voltage pulses (N) such that the voltage profiles of the compensation pulses (K, K1, K2) counteract an excitation of a mechanical oscillation in the crystal of the Pockels cell by the use voltage pulses (N),
wherein the voltage profile of the compensation pulses (K, K1, K2) each has a first compensation voltage switching operation and a second compensation voltage switching operation, and
wherein the first compensation voltage switching operation occurs substantially simultaneously or with a time delay which substantially corresponds to a period ($T_{R1}$) or a multiple of the period ($T_{R1}$) of a resonant frequency ($f_{R1}$, $f_{R2}$, $f_{R3}$) of the crystal of the Pockels cell, after the voltage switching operation to be compensated, and/or
the second compensation voltage switching operation occurs after the voltage switching operation to be compensated and subsequent to the associated first compensation voltage switching operation with a time delay which corresponds substantially to a period ($T_{R1}$) or an integer multiple of the period ($T_{R1}$) of a resonant frequency ($f_{R1}$, $f_{R2}$, $f_{R3}$) of the crystal of the Pockels cell.

15. The method of claim 14, wherein a time delay between one of the use voltage pulses (N) and the compensation pulse (K, K1) directly following that use voltage pulse (N) is substantially zero so that the voltage switching operations occur at the end of the use pulse (N) and at the beginning of the compensation pulse (K, K1) at substantially the same time so that the associated vibration excitations compensate each other, and/or wherein voltage switching operations having a voltage gradient inverse to the use switching operation to be compensated are used for the compensation.

16. A method for exciting a crystal of a Pockels cell with high-voltage pulses for polarization setting of laser radiation passing through the crystal, comprising:
- applying a sequence of use voltage pulses (N) to the crystal which each have a use period duration (TP, N) and a use pulse width (TN) and are configured to induce birefringence of the crystal via an electrical polarization in the crystal for the polarization setting of the laser radiation, and
- applying a sequence of compensation pulses (K, K1, K2), which each have a voltage profile, to the crystal, the sequence of compensation pulses (K, K1, K2) being overlaid in time with the sequence of use voltage pulses (N) such that the voltage profiles of the compensation pulses (K, K1, K2) counteract an excitation of a mechanical oscillation in the crystal of the Pockels cell by the use voltage pulses (N),
- wherein the voltage profile of one of the compensation pulses (K, K1) has a compensation voltage switching operation which takes place with a time offset of at most 12.5% of the resonance period ($T_{R1}$) of the crystal after the second voltage switching operation, and/or wherein the voltage profile of one of the compensation pulses (K) has a compensation voltage switching operation which occurs with a time offset of maximum 12.5% of the resonance period ($T_{R1}$) of the crystal with respect to an integer multiple of the resonance period ($T_{R1}$).

17. The method of claim 16, wherein the time offset of the compensation voltage switching operation is at most 5% after the second voltage switching operation and/or with respect to an integer multiple of the resonance period ($T_{R1}$).

18. The method of claim 17, wherein the time offset is at least 1% of the resonance period ($T_{R1}$) of the crystal after the second voltage switching operation and/or with respect to an integer multiple of the resonance period ($T_{R1}$).

19. The method of claim 16, wherein the time offset of the compensation voltage switching operation is within the range of 5% to 10% of the resonance period ($T_{R1}$) of the crystal after the second voltage switching operation and/or with respect to an integer multiple of the resonance period ($T_{R1}$).

20. A method for exciting a crystal of a Pockels cell with high-voltage pulses for polarization setting of laser radiation passing through the crystal, comprising:
- applying a sequence of use voltage pulses (N) to the crystal which each have a use period duration (TP, N) and a use pulse width (TN) and are configured to induce birefringence of the crystal via an electrical polarization in the crystal for the polarization setting of the laser radiation, and
- applying a sequence of compensation pulses (K, K1, K2), which each have a voltage profile, to the crystal, the sequence of compensation pulses (K, K1, K2) being overlaid in time with the sequence of use voltage pulses (N) such that the voltage profiles of the compensation pulses (K, K1, K2) counteract an excitation of a mechanical oscillation in the crystal of the Pockels cell by the use voltage pulses (N),
- wherein the compensation pulses (K, K1, K2) form polarization windows whose start lies at a time offset of at most 12.5% of the use period duration relative to a delay of an integer multiple of the resonance period with respect to the second voltage switching operation of the use window and whose end lies at an integer multiple of the resonance period with respect to the start of the use window.

21. A method for exciting a crystal of a Pockels cell with high-voltage pulses for polarization setting of laser radiation passing through the crystal, comprising:
- applying a sequence of use voltage pulses (N) to the crystal which each have a use period duration (TP, N) and a use pulse width (TN) and are configured to induce birefringence of the crystal via an electrical polarization in the crystal for the polarization setting of the laser radiation, and
- applying a sequence of compensation pulses (K, K1, K2), which each have a voltage profile, to the crystal, the sequence of compensation pulses (K, K1, K2) being overlaid in time with the sequence of use voltage pulses (N) such that the voltage profiles of the compensation pulses (K, K1, K2) counteract an excitation of a mechanical oscillation in the crystal of the Pockels cell by the use voltage pulses (N),
- wherein at least one of the voltage switching operations of the use voltage pulses (N) and of the compensation pulses (K, K1, K2) comprises a sudden voltage change in the range from a few hundred volts to a few kilovolts, and
- wherein the voltage change of one of the compensation voltage switching operations is in the order of magnitude of the voltage change of the voltage switching operation of the use voltage pulse (N).

22. The method of claim 21, wherein
the voltage change of the compensation voltage switching operations of a compensation pulse (K1, K2) is reduced in comparison with the voltage change of the first use voltage switching operation and/or of the second use voltage switching operation.

23. The method of claim 22, wherein the compensation is supplemented with at least one compensation voltage switching operation forming a further compensation pulse (K2).

24. The method of claim 22, wherein
the reduction of the voltage change of the compensation voltage switching operations in comparison with the voltage change of the first voltage switching operation and/or of the second voltage switch-off operation is at least so great that the reduced voltage change between the compensation voltage switching operations causes a laser radiation loss in the optical beam path of a laser system.

* * * * *